United States Patent
Palenius et al.

(10) Patent No.: US 7,269,421 B2
(45) Date of Patent: Sep. 11, 2007

(54) CONTROL OF FRAME TIMING ON HANDOVER

(75) Inventors: Torgny Palenius, Löddeköpinge (SE); Christer Östberg, Staffanstorp (SE)

(73) Assignee: Telefonktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 10/507,971

(22) PCT Filed: Mar. 24, 2003

(86) PCT No.: PCT/EP03/03057

§ 371 (c)(1),
(2), (4) Date: Nov. 14, 2005

(87) PCT Pub. No.: WO03/081931

PCT Pub. Date: Oct. 2, 2003

(65) Prior Publication Data

US 2006/0063556 A1    Mar. 23, 2006

Related U.S. Application Data

(60) Provisional application No. 60/370,636, filed on Apr. 8, 2002.

(30) Foreign Application Priority Data

Mar. 27, 2002   (EP) ................................ 02252254

(51) Int. Cl.
*H04Q 7/20* (2006.01)
(52) U.S. Cl. ............... 455/442; 455/334; 455/432.1; 455/436; 455/443; 455/525; 370/350; 370/516; 370/518; 375/356; 375/371

(58) Field of Classification Search ................ 455/436, 455/442, 438, 439, 441, 515, 452.1, 452.2, 455/9, 67.13, 67.11, 453, 130, 226.1, 334, 455/432.1, 443, 500, 517, 524, 525; 370/310, 370/324, 328, 350, 503, 516, 518, 519; 375/356, 375/371
See application file for complete search history.

(56) References Cited

U.S. PATENT DOCUMENTS 5,469,468 A * 11/1995 Schilling ..................... 375/130
(Continued)

FOREIGN PATENT DOCUMENTS

WO    WO 02/07345    1/2002
(Continued)

OTHER PUBLICATIONS

3GPP; "Requirements for Support of Radio Resource Management (FDD)"; Dec. 13-15; p. 1-34.
(Continued)

*Primary Examiner*—William Trost
*Assistant Examiner*—James D Ewart
(74) *Attorney, Agent, or Firm*—Michael Cameron

(57) ABSTRACT

The uplink transmission timing from a mobile communications device is defined with reference to the downlink reception timing of signals from a particular reference cell. When that reference cell is removed from the active set, there is defined a virtual reference cell, the timing of which is defined with reference to one or more of the cells remaining in the active set, such that the timing of this new virtual reference cell corresponds to the timing of the previous reference cell. The timing of the uplink transmission from the user equipment are then defined with reference to the new virtual reference cell, in the conventional way. This has the advantage that, following a soft handover, it is not necessary to adjust the timing of uplink transmissions from the user equipment.

14 Claims, 3 Drawing Sheets

U.S. PATENT DOCUMENTS

| | | | |
|---|---|---|---|
| 5,640,679 A | 6/1997 | Lundqvist et al. | |
| 5,828,659 A * | 10/1998 | Teder et al. | 370/328 |
| 6,078,572 A * | 6/2000 | Tanno et al. | 370/335 |
| 6,208,871 B1 | 3/2001 | Hall et al. | |
| 6,584,315 B1 * | 6/2003 | Kang et al. | 455/442 |
| 6,657,988 B2 * | 12/2003 | Toskala et al. | 370/350 |
| 6,681,099 B1 * | 1/2004 | Keranen et al. | 455/67.16 |
| 6,822,969 B2 * | 11/2004 | Love et al. | 370/444 |
| 6,856,611 B2 * | 2/2005 | Chaudhuri et al. | 370/335 |
| 6,873,612 B1 * | 3/2005 | Steer et al. | 370/342 |
| 7,031,277 B2 * | 4/2006 | Choi et al. | 370/331 |
| 7,190,691 B2 * | 3/2007 | Hwang et al. | 370/350 |
| 2002/0045451 A1 * | 4/2002 | Hwang et al. | 455/442 |
| 2002/0049057 A1 * | 4/2002 | Moulsley et al. | 455/436 |
| 2003/0002470 A1 * | 1/2003 | Park et al. | 370/342 |
| 2005/0053049 A1 * | 3/2005 | Blanz et al. | 370/350 |

FOREIGN PATENT DOCUMENTS

WO    WO 02/15624    2/2002

OTHER PUBLICATIONS

3GPP; "Requirements for Support of Radio Resource Management (FDD)"; Dec. 13-15; pg. 1-34 Dec. 1999.

* cited by examiner

CONTROL OF FRAME TIMING ON HANDOVER

This patent application claims the benefit of priority from U.S. Provisional Patent Application Ser. No. 60/370,636 filed on Apr. 8, 2002. This application incorporates by reference the entire disclosure of U.S. Provisional Patent Application Ser. No. 60/370,636.

TECHNICAL FIELD OF THE INVENTION

This invention relates to a mobile communications system, and in particular to a method of controlling the timing of frames defined for data receipt and transmission in a mobile communications device. Other aspects of the invention relate to the mobile communications device itself, and to the network which implements the method.

BACKGROUND OF THE INVENTION

In the proposed Universal Mobile Telephony System (UMTS), defined by the standards published by the 3rd Generation Partnership Project (3GPP), a mobile device, or user element UE, can establish links with several cells in the cellular radio network.

The data received by the user equipment from each of the cells is transmitted in frames on respective downlink channels. The frames in the respective downlink channels are not synchronized with each other. Moreover, because of possible movement of the user equipment relative to the base stations in the different cells, the timing of each downlink frame, relative to the other received downlink frames, can change.

The user equipment transmits data in frames on uplink channels to the base stations in the cells with which the user equipment has links. Thus, there is defined for the user equipment a transmission frame timing, which is common to all of the uplink channels. This transmission frame timing is defined with reference to the downlink frame timing of one of the active links.

Thus, in the Technical Specification 3GPP TS 25.133 v3.8.0, section 7, and the associated test case at section A.7, there is described a method for defining the timing of the, uplink transmission frame. Specifically, in the case where there is a single active link, the uplink frame transmission takes place a time $T_0$ (=1,024 chips) after the reception of the first detected path of the corresponding downlink frame.

When the user equipment has one active link with a cell, its transmission frame timing is set with reference to the downlink frame timing of that cell, and the transmission frame timing is still defined with reference to the downlink frame timing of that first cell, even when a second cell is added to the active set. However, in that case, when the first cell is removed from the active set, the uplink transmit timing is adjusted, at a defined adjustment rate, until the uplink frame transmission takes place $T_0$ (=1,024 chips) after the reception of the first detected path of the downlink frame from the remaining active link.

Thus, according to the published Technical Specification, there is defined a reference cell, that is the cell with reference to which the uplink frame transmission is defined. When there are two active links, and the reference cell is removed from the active set, the remaining cell becomes the reference cell.

However, this does not indicate how the uplink frame transmission should be defined in the event of a soft handover, when there are more than two active links, and the reference cell is removed from the active set.

SUMMARY OF THE INVENTION

According to the published Technical Specification, discussed above, the uplink transmission timing is defined with reference to the downlink reception timing of signals from a particular reference cell. When that reference cell is removed from the active set, the Technical Specification envisages that another cell from the active set be defined as the new reference cell, and that the uplink transmission timing should be adjusted so that it is defined with reference to the downlink reception timing from the new reference cell.

However, large adjustments are undesirable, since they can have the effect that another active cell must be removed from the active set, because its transmissions no longer fall within the receiver window of the user equipment. On the other hand, choosing a new reference cell simply because it would require the smallest adjustment may also be undesirable because, if that cell were itself to be removed from the active set, it would then be necessary to choose another new reference cell.

According to the present invention, therefore, there is defined a virtual reference cell, the timing of which is defined with reference to one or more of the cells remaining in the active set, such that the timing of this new virtual reference cell corresponds to the timing of the previous reference cell. The timing of the uplink transmissions from the user equipment are then defined with reference to the new virtual reference cell, in the conventional way.

This has the advantage that, following a soft handover, it is not necessary to adjust the timing of uplink transmissions from the user equipment.

The virtual reference cell may be defined with reference to the active cell which first joined the active set, the cell whose downlink transmission timing most closely corresponds to the downlink transmission timing of the previous reference cell, or the cell from which the strongest signal is being received, or may be defined with reference to the average timing of all of the cells in the active set.

According to another aspect of the present invention, there is provided user equipment which is able to define a virtual reference cell as described above, following a soft handover.

It should be emphasized that the term "comprises/comprising" when used in this specification is taken to specify the presence of stated features, integers, steps or components but does not preclude the presence or addition of one or more other features, integers, steps, components or groups thereof.

DETAILED DESCRIPTION OF PREFERRED EMBODIMENTS

Figure 1:
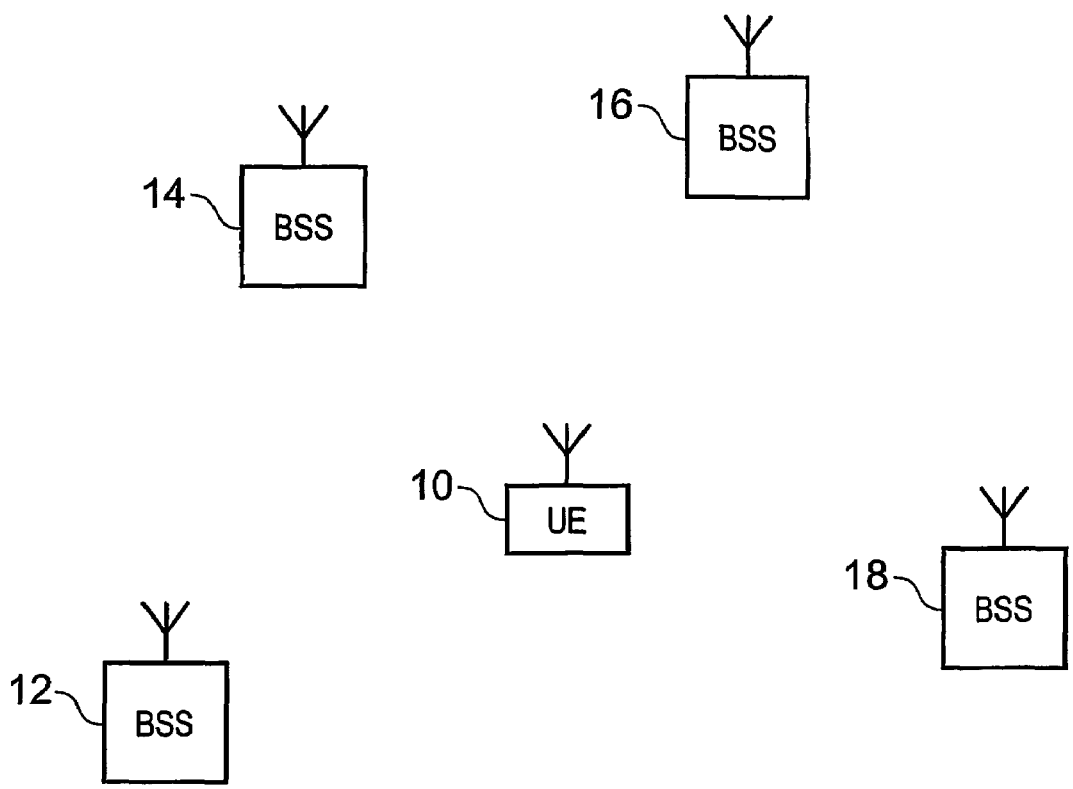
FIG. 1 is a schematic representation of a part of a mobile communications network in accordance with an aspect of the invention.

FIG. 1 illustrates a part of a mobile communications network in accordance with the present invention. Specifically, FIG. 1 shows a user equipment (UE) 10, which is moveable within a network of base station systems (BSS) 12, 14, 16, 18. The base station systems (BSS) 12, 14, 16, 18 have respective overlapping coverage areas, or cells. It will be obvious that the network contains more base station systems than the four shown in FIG. 1. Each of the base station systems 12, 14, 16, 18 has a respective connection (not shown in FIG. 1) to a data communications network.

The invention is described herein with reference to the Universal Mobile Telephony Service (UMTS), as defined by the 3rd Generation Partnership Project (3GPP).

In such a system, the user equipment 10 may have active radio links with more than one base station system. The base station systems with which the user equipment has active radio links are defined as the active set. In use, for example as the user equipment moves further from or nearer to particular base station systems, some radio links may be lost, and new radio links may be set up. This process of changing the membership of the active set is known as soft handover.

Figure 2:
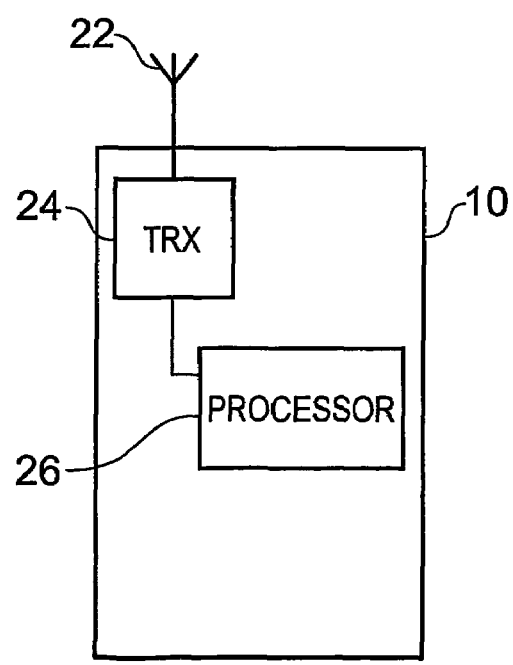
FIG. 2 is a block schematic diagram of a mobile communications device in accordance with an aspect of the invention.

FIG. 2 is a schematic diagram of the relevant parts of the user equipment 10. It will be apparent that the user equipment 10 has many other features and functions which are not described herein, as they are not essential for an understanding of the present invention. The user equipment 10 takes the form of portable radio communication equipment, which may for example be a mobile telephone, or personal digital assistant (PDA) with wireless communication facility. The UE 10 has an antenna 22, which receives and transmits signals over the air interface to one or more of the base station systems in the network. Received signals are passed to transceiver (TRX) circuitry 24, and then to a processor 26. Conversely, signals for transmission are passed from the processor 26 to the transceiver circuitry 24, and then to the antenna 22.

The processor 26 is responsible for separating the wanted signals out from all of the received radio signals, and is also responsible for receiving the data which is to be transmitted, and converting it into a form which is suitable for transmission over the air interface.

Figure 3:
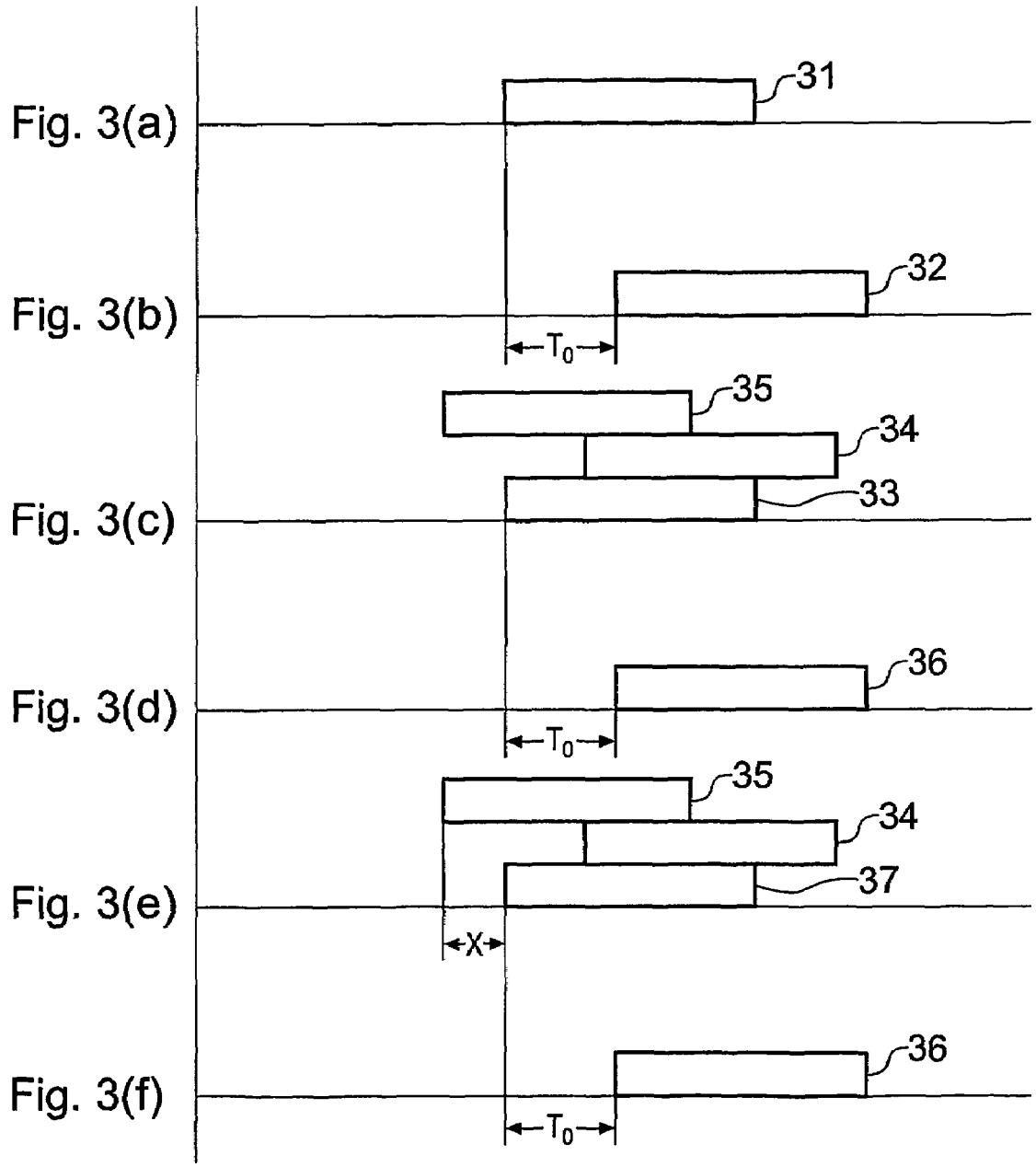
FIG. 3 is a timing diagram showing the relationship between uplink and downlink frame timing in accordance with the invention.

FIG. 3 is a timing diagram, in which FIGS. 3(a) and 3(b) show the situation when the user equipment 10 has one active radio link. In that case, the user equipment sets the timing of a downlink frame 31, namely the frame timing of the detected downlink signals on the active radio link.

FIG. 3(b) shows the uplink frame transmission timing. As is conventional, the uplink frame 32 begins $T_0$ (=1,024 chips) after the reception of the first detected path of the corresponding downlink frame 31.

In use, for example as the user equipment moves relative to the base station with which it has the active radio link, it may be necessary to adjust the frame timings from one frame to the next.

The start of the downlink frame 31 can be referred to as the received radio link timing, and this also defines a receiver window, which extends a fixed time (=148 chips) before and after the received radio link timing. Other radio links are only permitted if their respective received radio link timings are within this receiver window.

FIG. 3(c) shows the situation when the user equipment has three radio links. The signals received on the three downlink channels are received at different times, the respective downlink frame timings being illustrated by the reference numerals 33, 34, 35. FIG. 3(c) shows the relative timings of the three windows at one particular instant. However, as before, movement of the user equipment relative to the base stations can mean that these relative timings change in use.

As described above with reference to FIG. 3(b), the transmit frame 36 is defined with reference to one of the reception frames. In this case, the cell which has the downlink frame timing 33 is defined as the reference cell, and the transmitted frame 36 is set to start $T_0$ (=1,024 chips) after the start of the received frame 33, as shown in FIG. 3(d).

Also, the receiver window, within which the received frames of other active radio links must lie, is defined with reference to the start of the received frame 33.

Figure 4:
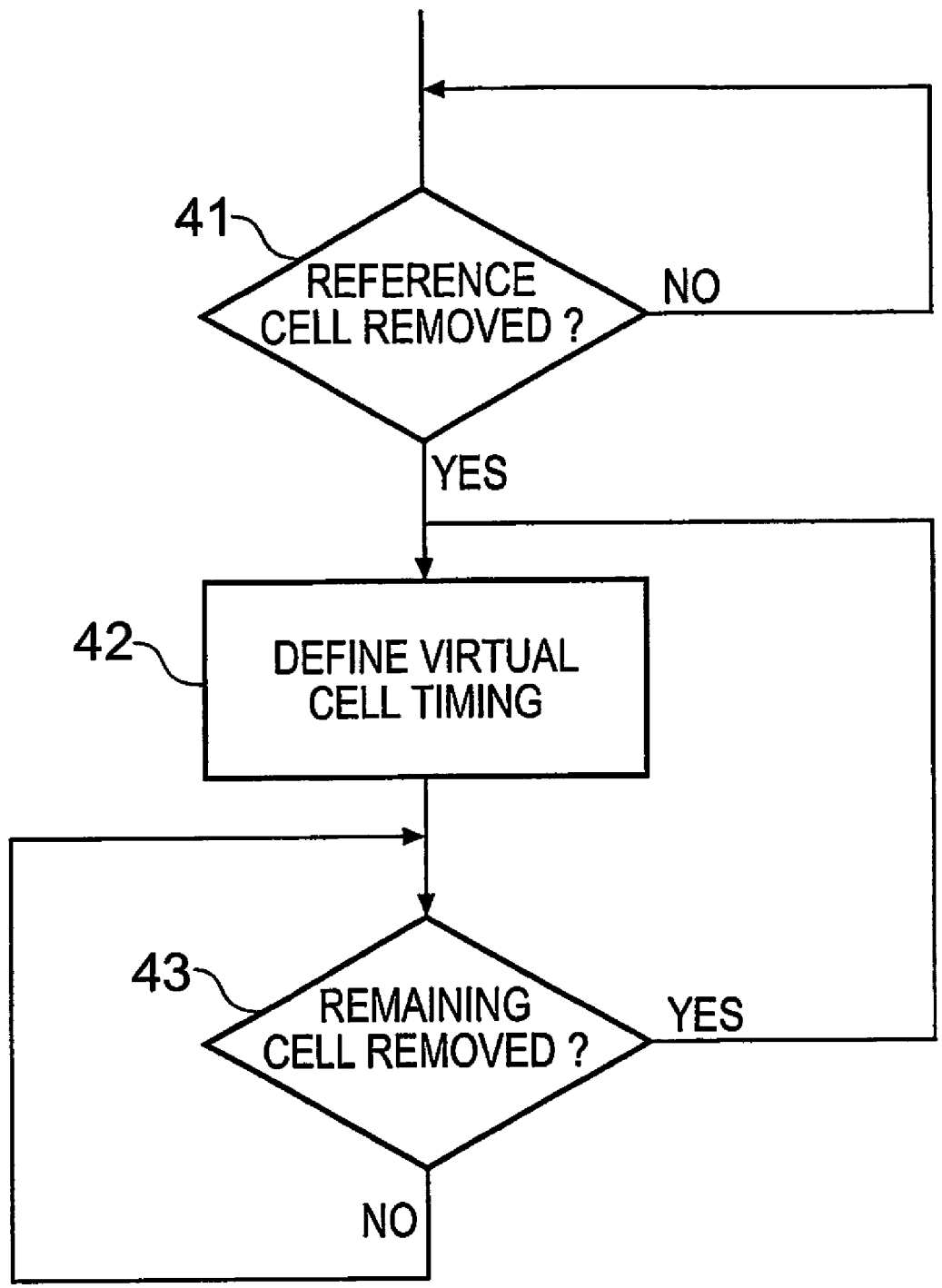
FIG. 4 is a flow chart illustrating a method in accordance with an aspect of the invention.

FIG. 4 is a flow chart illustrating a method in accordance with the invention, and FIGS. 3(e) and 3(f) show the relative frame timings which are obtained. In step 41 of the process, it is determined within the user equipment whether the reference cell has been removed from the active set for that user equipment. If is has not, there is no change, and the process returns to the start. However, if the reference cell has been removed from the active set then, in accordance with the present invention, a new virtual reference cell is defined.

Thus, in order to avoid the need to select a new reference cell from the remaining cells of the active set, and therefore the need to adjust the transmission frame timing and the timing of the receiver window, a virtual reference cell is defined. The virtual reference cell is a cell which is not used for reception or transmission of signals over the air interface, but which is used in determining the timing of transmissions. Specifically, as shown in FIG. 3(e), the virtual reference cell has a frame timing 37 which corresponds exactly to the receiver frame timing 33 of the previous reference cell.

The timing of the virtual reference cell receiver frame 37 is defined with reference to one of the remaining cells. In the case illustrated in FIG. 3(e), the receiver frame timing 37 of the virtual reference cell is defined as being a time X after the receiver frame timing 35 of one of the remaining cells. This remaining cell could be chosen because it has the strongest signal, or because it is the earliest received signal, or because it is the cell which is closest in time to the original reference cell. As an alternative, the timing of the new virtual reference cell could be determined relative to the average timing of the remaining cells.

Then, as shown in FIG. 3(f), the transmit frame 36 is defined with reference to the virtual reference cell reception frame 37. Because the virtual reference cell is chosen to have a timing which is the same as the previous reference cell, it is not necessary to make large adjustments to the timing of the transmission frame 36. This means that the transmission frame timing does not need to be adjusted, and therefore that the quality of the modulated signal received in the base station systems will be improved. It further means that the receiver window does not need to be adjusted, and therefore that there is no risk that useful radio links need to be removed from the active set because they no longer fall within the receiver window.

Of course, it should be noted that it remains possible to make adjustments to the frame timings, for example because of frequency errors between the base station and the user equipment, or in order to compensate for movement of the user equipment relative to the base stations, but these adjustments are relatively small.

Once a virtual reference cell has been defined then, in step 43 of the process shown in FIG. 4, it is tested whether the remaining cell, namely the cell with reference to which the virtual reference cell is defined, has been removed from the active set. Provided that the remaining cell remains in the active set, no action is necessary. However, in the event that that remaining cell is removed from the active set, it is necessary to redefine the timing of the virtual reference cell, for example with reference to one of the other remaining cells, or with reference to the average timing of all of the remaining cells.

There is therefore described a system for defining a transmission frame timing in the event of a soft handover, without interrupting existing transmissions.

As described above, the system is used when the soft handover removes a cell from the active set and a plurality of cells remain in the active set. However, the system in accordance with the invention can also be used by defining a virtual reference cell when one or more cells are removed from the active set and only one cell remains in the active set.

The invention claimed is:

1. A method of defining an uplink transmission frame timing, for use in a mobile communications system in which a user equipment may have radio links with a plurality of cells, and in which the cells with which the user equipment has radio links define an active set, wherein the uplink transmission frame timing is defined with reference to the downlink transmission frame timing of a reference cell selected from said active set, the method comprising:

when the reference cell is removed from the active set, defining a virtual reference cell, the timing of which is defined with reference to one of the cells remaining in the active set, such that the timing of the virtual reference cell corresponds to the timing of the previous reference cell; and defining the uplink transmission frame timing relative to the timing of the virtual reference cell.

2. A method as claimed in claim 1, wherein the uplink transmission frame timing is defined to be a fixed time after the virtual reference cell timing.

3. A method as claimed in claim 2, for use in UMTS, wherein the uplink transmission frame timing is defined to be $T_0$ (=1,024 chips) after the virtual reference cell timing.

4. A method as claimed in claim 1, wherein the virtual reference cell timing is defined with reference to the active cell which first joined the active set.

5. A method as claimed in claim 1, wherein the virtual reference cell timing is defined with reference to the active cell whose downlink transmission timing most closely corresponds to the downlink transmission timing of the previous reference cell.

6. A method as claimed in claim 1, wherein the virtual reference cell timing is defined with reference to the active cell from which the strongest signal is being received.

7. A method as claimed in claim 1, wherein the virtual reference cell timing is defined with reference to the average timing of all of the cells in the active set.

8. A mobile communications device, for use in a mobile communications system in which a mobile communications device may have radio links with a plurality of cells, and in which the cells with which the device has radio links define an active set, wherein the device comprises:

means for defining an uplink transmission frame timing with reference to the downlink transmission frame timing of a reference cell selected from said active set, and wherein the device is adapted, when the reference cell is removed from the active set, to: define a virtual reference cell, the timing of which is defined with reference to one or more of the cells remaining in the active set, such that the timing of the virtual reference cell corresponds to the timing of the previous reference cell; and to define the uplink transmission frame timing relative to the timing of the virtual reference cell.

9. A mobile communications device as claimed in claim 8, wherein the uplink transmission frame timing is defined to be a fixed time after the virtual reference cell timing.

10. A mobile communications device as claimed in claim 8, for use in UMTS, wherein the uplink transmission frame timing is defined to be $T_0$ (=1,024 chips) after the virtual reference cell timing.

11. A mobile communications device as claimed in claim 8, wherein the virtual reference cell timing is defined with reference to the active cell which first joined the active set.

12. A mobile communications device as claimed in claim 8, wherein the virtual reference cell timing is defined with reference to the active cell whose downlink transmission timing most closely corresponds to the downlink transmission timing of the previous reference cell.

13. A mobile communications device as claimed in claim 8, wherein the virtual reference cell timing is defined with reference to the active cell from which the strongest signal is being received.

14. A mobile communications device as claimed in claim 8, wherein the virtual reference cell timing is defined with reference to the average timing of all of the cells in the active set.

* * * * *

UNITED STATES PATENT AND TRADEMARK OFFICE
CERTIFICATE OF CORRECTION

PATENT NO. : 7,269,421 B2 Page 1 of 1
APPLICATION NO. : 10/507971
DATED : September 11, 2007
INVENTOR(S) : Palenius et al.

It is certified that error appears in the above-identified patent and that said Letters Patent is hereby corrected as shown below:

On the Title Page, item (73), under "Assignee", in Column 1, Line 1, delete "Telefonktiebolaget" and insert -- Telefonaktiebolaget --, therefor.

Signed and Sealed this

Ninth Day of September, 2008

JON W. DUDAS
*Director of the United States Patent and Trademark Office*